United States Patent

Sluys et al.

[15] 3,700,798

[45] Oct. 24, 1972

[54] METHOD OF RECORDING AND/OR REPRODUCING VIDEO SIGNALS

[72] Inventors: Robert Nestor Joseph Sluys; Johannes Hendrik Wessels; Willem Van Den Bussche, all of Emmasingel, Eindhoven, Netherlands

[73] Assignee: U.S. Philips Corporation, New York, N.Y.

[22] Filed: June 30, 1965

[21] Appl. No.: 468,326

[30] Foreign Application Priority Data

July 4, 1964 Netherlands.............6407633

[52] U.S. Cl.........................178/6.6 SF, 179/100.2 T

[51] Int. Cl..........G11b 5/52, H04n 5/78, H04n 7/12

[58] Field of Search....178/6.6 A, DIG. 3; 179/15.55, 179/100.2 T

[56] References Cited

UNITED STATES PATENTS 3,359,365 12/1967 Kihara....................178/6.6 A

*Primary Examiner*—Howard W. Britton

*Attorney*—Frank R. Trifari

[57] ABSTRACT

A method of recording and reproducing video signals by recording KN fields of every $kn^2$ fields of the video signal, and by scanning each recorded field $n$ times. Apparatus including a drum around which recording tape is helically wound within which $n$ recording heads rotate is also disclosed.

4 Claims, 10 Drawing Figures

INVENTORS
ROBERT N.J. SLUYS
JOHANNES H.WESSELS
WILLEM V DEN BUSSCHE
BY

Frank R. Trifari
AGENT

INVENTORS
ROBERT N.J. SLUYS
JOHANNES H.WESSELS
BY WILLEM V DEN BUSSCHE
Frank R. Trifari
AGENT

INVENTORS
ROBERT N.J. SLUYS
JONANNES H.WESSELS
BY WILLEM V DEN BUSSCHE

AGENT

INVENTORS
ROBERT N.J. SLUYS
JOHANNES H. WESSELS
BY WILLEM V DEN BUSSCHE
Frank R. Trifari
AGENT

INVENTORS
ROBERT N.J. SLUYS
JOHANNES H. WESSELS
WILLEM V DEN BUSSCHE
BY
AGENT

METHOD OF RECORDING AND/OR REPRODUCING VIDEO SIGNALS

The invention relates to a method of recording and/or reproducing video signals on or from a record carrier in tracks each containing information about at least the period of one field of the video signal.

According to one aspect of the invention $kn$ fields ($k$ = positive integer, $n$ = a integer > 1) of $kn^2$ fields are registered in $n$ tracks and at the reproduction of each of these tracks in scanned $n$ times so that an uninterrupted sequence of $kn^2$ fields appears at the output terminals of a scanning device.

Such a method has the advantage that with a small loss of information a considerable economy of recording material can be obtained.

In one embodiment of the method according to the invention $n$ recording members register $n$ successive tracks and then skip $(n^2 - n)$ tracks, whereas at the reproduction $n$ reproducing members, after having scanned and reproduced $n$ tracks restart at the second scanned track of each series of $n$ scans.

In a further embodiment of the method according to the invention one recording member records one of the $n$ successive tracks and does not record the next-following $(n-1)$ tracks, whereas during reproducing $n$ reproducing members, after having reproduced $n$ tracks, restart at the second scanned track of each series of $n$ scans.

One device for recording and/or reproducing video signals operating in accordance with this method has $n$ recording or reproducing members. In such a device a tape-shaped record carrier is helically wound around a drum having a radius $r$. The drum has a slot at right angles to its axis. In the slot the recording or reproducing members respectively rotate about this axis. The record carrier is scanned, according to a further aspect of the invention, through an angle of about $(360/n)°$ by each of the recording or reproducing members respectively. The recording or reproducing members following the first member writing the first track are displaced with respect to the latter member along the circumference of the slot in a direction opposite the members rotation over a distance of $$(m-1)\frac{2\pi r}{n} + (m-1)\frac{(n-1)}{n} a \text{ cotangent } \alpha$$

cotangent (hereinafter referred to as cotg$\alpha$) and in an axial direction over a distance of $(m-1)\,a$, wherein $\alpha$ is the angle between the slot and the longitudinal direction of the record carrier, $m$ is the ordinal number of the recording or reproducing member respectively and $a$ is the distance between the track centers, against the direction of the components of the movements of the record carrier relative to the slot. After one revolution of the recording or reproducing members the record carrier is displaced substantially over a distance $a$ in the axial direction.

In this device the $n$ recording members register, during one revolution, successively $n$ consecutive tracks and do not register subsequently during $(n-1)$ revolutions. During this time the record carrier has travelled to an extent such that starting by the $(n+1)^{th}$ revolution again $n$ tracks are recorded, which join the first $n$ tracks. At the reproduction $n$ producing members will scan $n$ consecutive tracks, after which the first reproducing members again scan the second track and the further members scan the further tracks up to the $(n-1)$track and so on, so that each track is scanned $n$-times with $(n-2)$ intervals.

It will be obvious that, if all recording or reproducing members were caused to rotate in a plane at right angles to the axis of the drum, after $1/n$ revolutions of said members the tape would have shifted only over a distance of $1/n$ times the central distance between the tracks, while the next-following member would again cover partly the first track, which is not desirable. Therefore the members following the member that writes the first track are off-set over such a distance in the direction of travel of the record carrier with respect to the slot that the tracks are again disposed just side by side.

In a further device for recording video signals according to the invention having one recording member and a tape-shaped record carrier wound helically around a drum having a radius $r$ the drum has a slot at right angles to its axis, in which slot the recording member rotates about the axis. The record carrier is covered, according to the invention , through an angle of substantially $(360/n)°$ by the recording member, while during one revolution of the recording member the carrier shifts in place over a distance $a$ in the axial direction, wherein $a$ is the desired central distance between the tracks.

In this device only one recording member is used, which records a track with $k$ fields during the (1th/$n$) part of one revolution. During this time the recording member scans the record carrier. During the next-following $(n-1^{th}/n)$ part of the revolution $k(n-1)$ fields are skipped. At the next-following revolution the record carrier has shifted just over a distance equal to the distance between the track centers and a new track is written just at the side of the first track. In this way the non-recorded fields are better distributed among the recorded ones. It will be obvious that this method of recording is also possible with a device comprising $n$ recording members, only one of which is energized.

In another such device for the reproduction of video signals, a tape-shaped record carrier is helically wound about a drum having a radius $r$. The drum has a slot at right angles to its axis,in which slot the reproducing members rotate about the axis. The record carrier is covered by the reproducing members through an angle of substantially $(360/n)°$, while the reproducing members following the member scanning the first track are displaced with respect to this member along the circumference of the slot in a direction in which the reproducing members rotate over a distance of $$(m-1)\frac{2\pi r}{n} \times \text{cotg } \alpha + (m-1)\frac{n-1}{n} \times a \text{ cotg } \alpha$$

and in an axial direction over a distance $(m-l)\,(n-1/a)\,a$, wherein $\alpha$ is the angle between the slit and the longitudinal direction of the record carrier, $m$ is the ordinal number of the head and $a$ is the center distance between two tracks measured in a direction opposite the components of the movement of the record carrier with respect to the slot. After one revolution of the reproducing members the record carrier shifts substantially over a distance $a$ in the axial direction.

Thereto applies the same as that stated with respect to the device comprising the $n$ recording members and reproducing members respectively. With this device, when the reproducing members are also suitable for recording, it is possible to use one reproducing member for recording, by energizing it and by leaving the other members without energization.

In a device for recording and/or reproducing video signals containing $n$ recording members, the latter are energized in accordance with the invention during one revolution and are then without energization during $(n-1)$ revolutions.

In said devices for the reproduction of video signals it is advantageous to have all reproducing members constantly switched on during reproduction, since complicated switching members can thus be avoided.

In devices for recording and/or reproducing video signals, in which a complete frame is composed of two interlaced fields, when $k$ is an odd number and $n$ is an even number, it is desirable to reproduce an interlaced frame. For this purpose, in accordance with the invention, the recording and reproducing members respectively of even-numbered order are shifted in place over a distance of half a line along the recorded track with respect to the recording or reproducing members respectively of the odd-numbered order.

If these reproducing members were not shifted in place, the next-following reproducing member, after scanning an odd-numbered field would scan the same field after not more than half a line period,. Therefore in one half of a line period two line synchronizing pulses would be applied to the amplifier. This would result in very sever requirements for the synchronization of the line time base, which can substantially not be fulfilled by the conventional fly-wheel circuits. Owing to this shift the line synchronizing pulses regain the correct distance, so that an interlaced picture will be produced.

The foregoing will now be explained more fully with reference to the accompanying figures , of which FIG. 1 shows an embodiment of a device according to the invention, comprising three recording and reproducing members, respectively which move in the same direction along the slot as the record carrier.

Figures 1, 2:
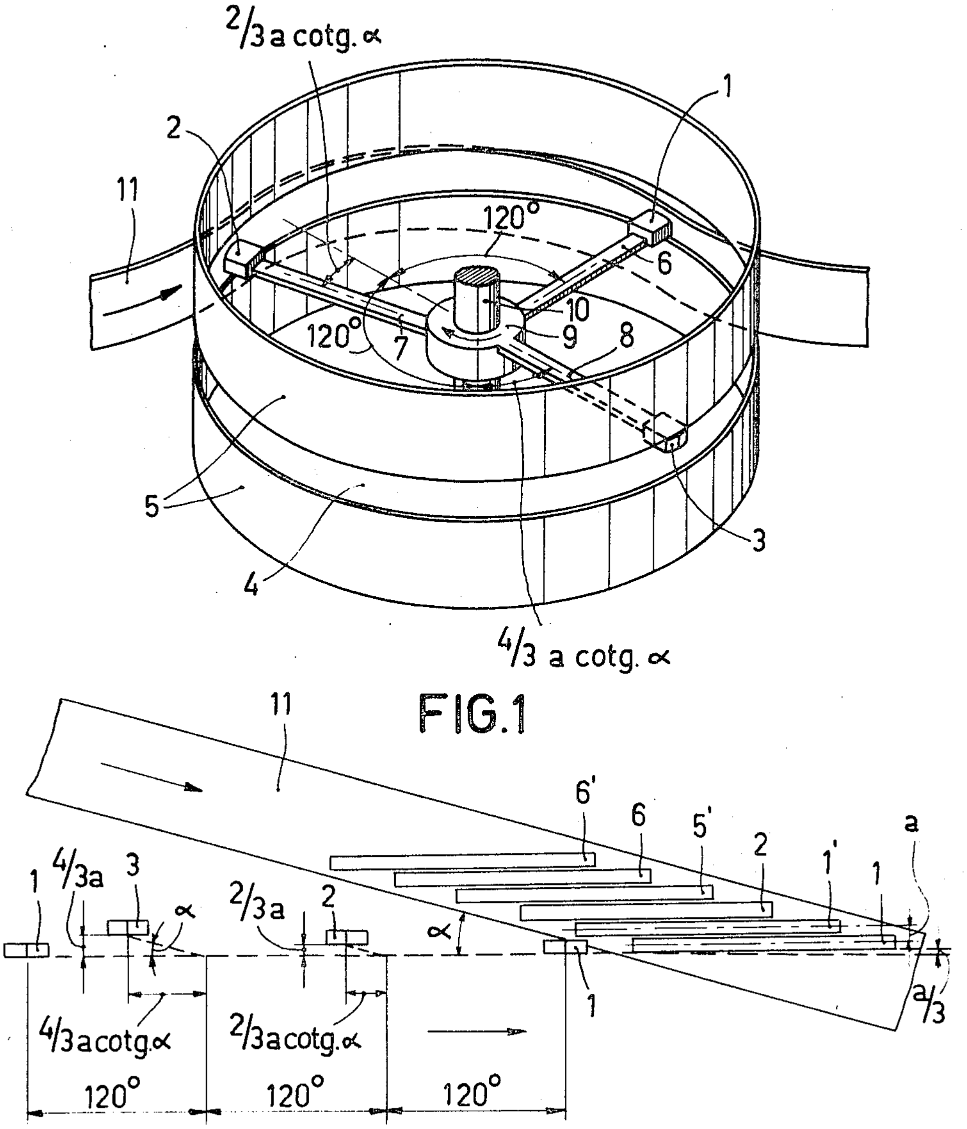
FIG. 2 is a developed view of the drum with the record carrier on which the tracks are recorded in accordance with the invention.

As is shown in FIG. 1 and 2 the device for recording and/or reproducing video signals contains three recording or reproducing members 1, 2 and 3. The slot revolve in a slot 4, which is provided at right angles to the axis of the drum 5. The recording and/or reproducing members 1, 2 and 3 are fastened to arms 6,7 and 8 respectively, which, in turn, are secured through a flange 9 to the shaft 10. The recording or reproducing members 2 and 3, following the first member 1, are shifted with respect to the latter member along the circumference of the slot in a direction opposite to the rotational direction of the recording members 4 over a distance of $$(m-1)\,\frac{2\pi r}{3}+(m-1)\,\frac{2}{3}\cdot a\cdot \text{cotg}\ \alpha$$

and in an axial direction over a distance $(m-1)\frac{2}{3}a$, wherein $\alpha$ is the angle between the slot 4 and the longitudinal direction of the record carrier wound around the drum 5, $m$ is the ordinal number of the head and $a$ is the desired center distance between the tracks, in a direction opposite the components of the movement of the tape 11 with respect to the slot 4. After one revolution of the recording or reproducing members 1, 2 and 3 the record carrier has moved substantially over a distance $a$ in the axial direction. Since in this device the heads 1, 2 and 3 move in the same direction as the tape 11, the total displacement of the heads 2 and 3 is $$\frac{2\pi r}{3}\,a\ \text{cotg}\ \alpha \text{ and } \frac{4\pi r}{3}+\frac{4}{3}\,a\ \text{cotg}\ \alpha$$

respectively in the direction of the circumference of the slot 4 and $\frac{2}{3}\,a$ and $(4/3)\,a$ respectively in an axial direction opposite the direction of movement of the tape.

If this additional shift were not provided for, the record carrier would have shifted in place only over one third of the center distance between the tracks, after one third revolution of the recording member, so that the next-following member would partly cover again the first track.

In this device the three recording members record, during one revolution, three adjacent tracks in order of succession, and then they do not record during two revolutions . During this period the record carrier 11 has moved to an extend such that, beginning by the fourth revolution three additional tracks are recorded. If one field is recorded per track and if one complete picture consists of two interlaced fields, each of the three recording members 1, 2 and 3 recording during one revolution and not recording during two revolutions, the fields 1, 1', 2 are recorded, as is shown in FIG. 2, after which the member 1 regains the track of the field 1', but does not record. After not having recorded for two revolutions the recording member is re-energized for one revolution, so that after the field 2 the fields 5', 6 and 6' are recorded. During the reproduction, however, the three reproducing members remain constantly switched on and they scan the tracks continuously in the order of succession 1, 1′, 2, 1′, 2,5′, 2,5′, 6,5′, 6,6′ and so on. The fields 1, 2 and so on are the odd-numbered fields and the fields 1′, 2′, and so on are the even-numbered fields.

Figures 3, 4:
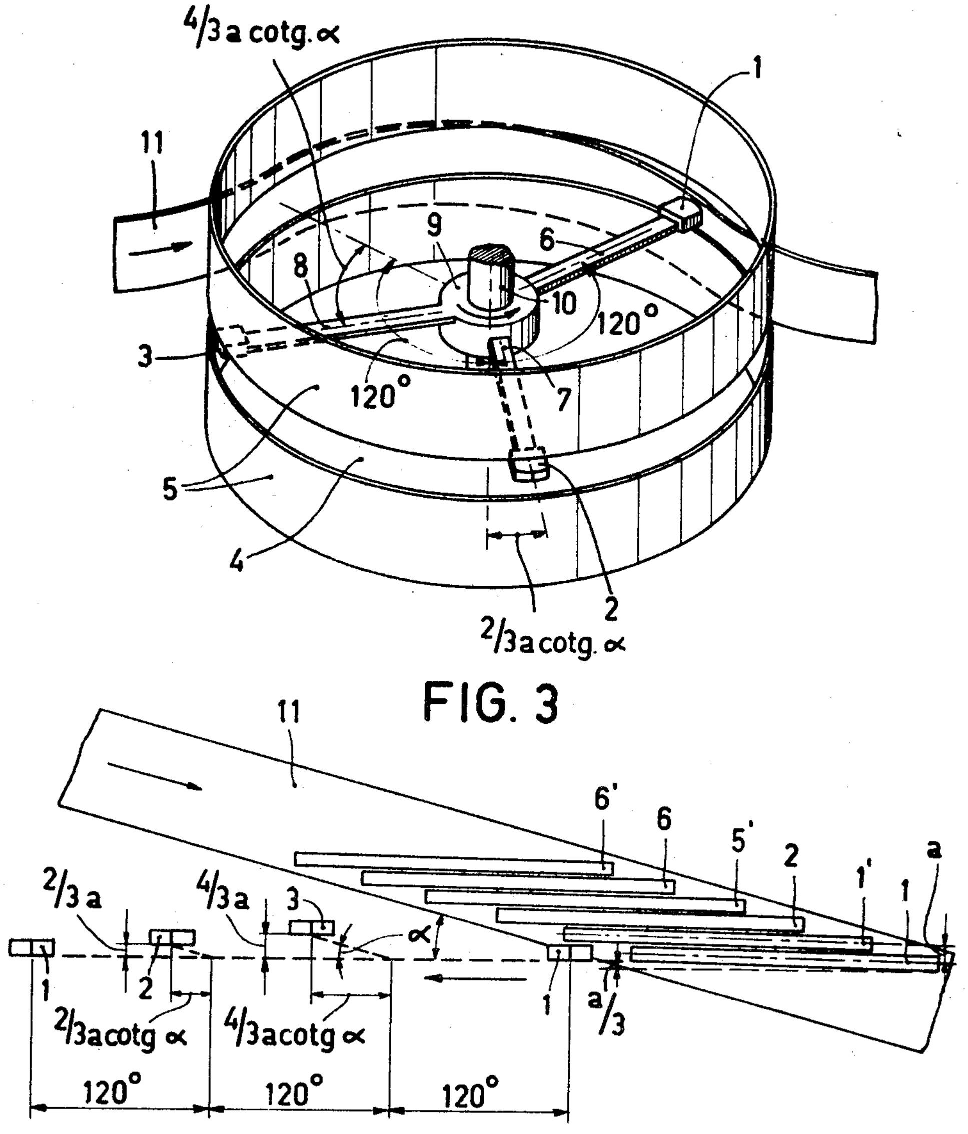
FIG. 3 shows a device like FIG. 1, in which the direction of travel of the recording and reproducing members respectively is opposite that of the record carrier.
FIG. 4 is an exploded view of the drum with the tracks recorded on the carrier in accordance with the invention.

FIGS. 3 and 4 show a device similar to that of FIGS. 1 and 2, the direction of movement of the heads being, however, opposite that of the tape. As a result, the total displacement of the second and third head respectively relative to the first head in the direction of the slot circumference is $$\frac{2\pi r}{3}-\frac{2}{3}a \text{ cotg } \alpha \text{ and } \frac{4\pi r}{3}-\frac{4}{3}a \text{ cotg } \alpha$$

respectively. The shifts in the axial direction of the heads 2 and 3, like in the preceding case, are ⅔ $a$ and (4/3) $a$ respectively.

Figure 5:
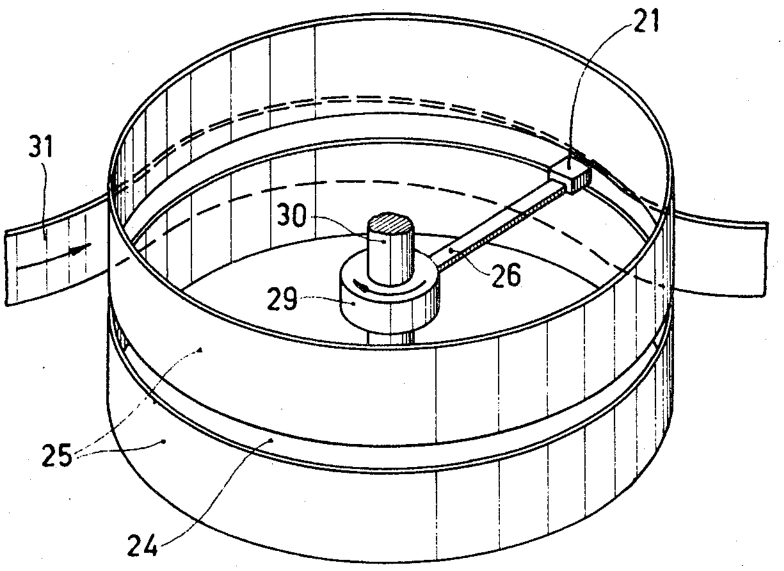
FIG. 5 shows a further device according to the invention for recording video signals, comprising one recording member, the record carrier being covered by the reproducing member over an angle of substantially 120°, like in the preceding embodiments.
Figure 6:
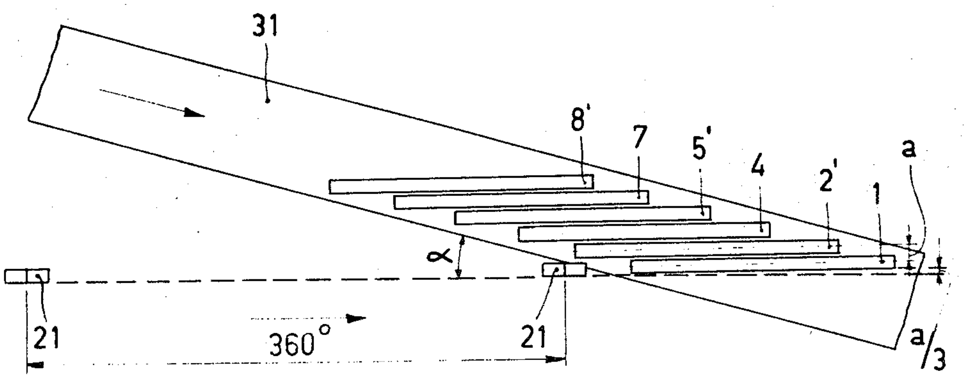
FIG. 6 is a developed view of the drum of FIG. 5 with the tracks recorded on the carrier.

The device for recording video signals shown in FIG. 5 comprises one recording member 21, which rotates in a slot 24, which is at right angles to the shaft 30 of the drum 25. This recording member is fastened to an arm 26, which is connected through a flange 29 with the shaft 30. The record carrier 31, wound on the drum 25, is covered by the recording member 21 over an angle of about 120°, while the record carrier 31 moves during each revolution over a distance a in the axial direction relatively to the slot, wherein $a$ is the desired center distance between two tracks. In FIG. 6 it is shown that in the case of recording one field per track the fields 1, 2′, 4,5′, 7 and so on are recorded. The reproducing device for the signals thus recorded on the carrier 11 is identical to that of FIG. 1, if the direction of movement of the recording member 21 is the same as that of the record carrier 31, whilst the reproducing members 1, 2 and 3 scan continuously. The order of succession of scan of the fields is then 1, 2′, 4,2′, 4,5′, 4,5′, 7, and so on. It will be obvious that instead of using a device as shown in FIG. 5, use may be made of a device shown in FIGS. 1 or 3, if care is taken only one of the three members is used for recording.

Figures 7, 8:
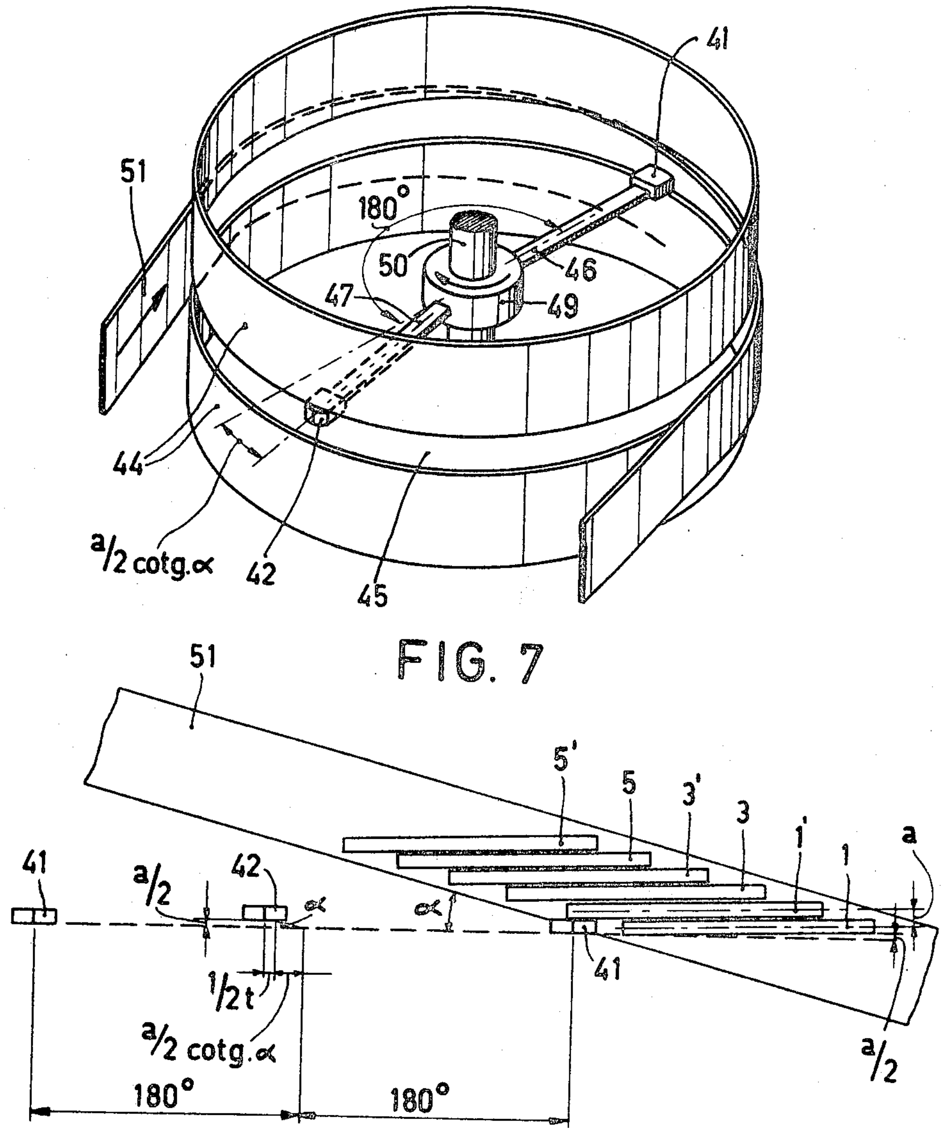
FIG. 7 shows a further embodiment of a device according to the invention, comprising two recording and reproducing members respectively.
FIG. 8 is the associated developed view of the drum with the record carrier with the tracks recorded thereon in accordance with the invention.

FIG. 7 shows an embodiment of a device according to the invention comprising two recording or reproducing heads 41 and 42, which rotate in a slot 44 provided at right angles to the shaft 50 of the drum 45, the shape being covered by each of the members over an angle of substantially 180°. These recording or reproducing members 41, 42 are fastened to arms 46 and 47, which are connected through a flange 49 with the shaft 50. The recording or reproducing member 42, following the first member 41, has shifted relatively to the latter member along the circumference of the slot 44 over a distance of $(m-1)(2\pi r/2)=\pi r$, plus a distance along said circumference in a direction opposite the rotational direction of the recording members over a distance of $$(m-1)\frac{1}{2}a \cot g\alpha=\frac{1}{2}a \cot g\alpha$$

in the axial direction over a distance $(m-1)½a=½a$, wherein $\alpha$ is the angle between the slot 44 and the longitudinal direction of the record carrier 51, wound on the drum 45, $m$ is the order of succession of the members and $a$ is the desired center distance between the tracks, in a direction opposite the components of the tape 51 movement with respect to the slot 44, while the record carrier 51 has moved, after one revolution of the recording or reproducing members 41, 42, substantially over a distance $a$ in the axial direction. Since in this device the recording and reproducing members 41 and 42 move in the same direction as the record carrier 51, the overall displacement of the member 42 is $\pi r+$ ½ $a$ cotg$\alpha$ along the circumference of the slot 44 and ½ $a$ in the axial direction opposite the direction of movement of the record carrier 51. If one field is recorded per track and if a complete picture comprises two interlaced fields ,each of the recording members 41, 42 recording during one revolution and not recording during one further revolution , the fields 1,1′,3,3′, 5,5′ and so on are recorded in order of succession, as is illustrated in FIG. 8. During the reproduction the two reproducing members remain constantly switched on, so that they scan the tracks continuously in the order of succession of 1, 1′, 1′,3,3,3′, 3′,5,5,5′ and so on. Since after every two fields two fields of the same kind (even-numbered fields or odd-numbered fields) are scanned one after the other, it is very difficult to obtain a satisfactory synchronization, since in this case two consecutive line pulses are at half of the normal distance. This disadvantage may be avoided by an additional displacement of the second recording or reproducing member in a radial direction over a distance $b/2$, which corresponds to half a line period, wherein $b$ is the distance on the tape between twwo line pulses. Thus all line pulses regain the normal distance. In this way the even-numbered fields 1′, 3′, and so on are changed so to say into odd-numbered fields. During scanning the second head will change the fields scanned again to even-numbered fields owing to said additional displacement, so that at the second reproducing an interlaced frame is obtained. It will be obvious that if the direction of movement of the recording or reproducing members 41, 42 is opposite that of the record carrier 51, the shift of the second member 42 with respect to the first member 41 is $\pi r-½a$ cotg$\alpha$ , while the displacement in an axial direction remains equal to ½ $a$.

Figure 9:
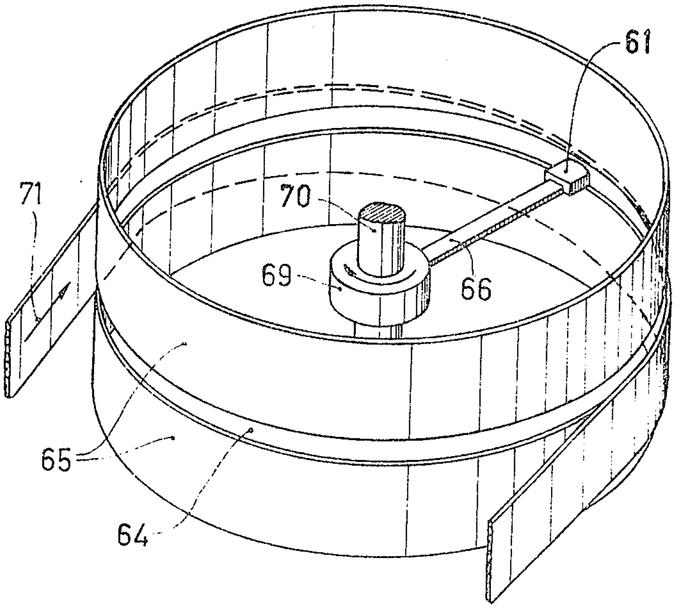
FIG. 9 shows a device according to the invention comprising one recording head, the tape being covered, like in the device shown in FIG. 7, by the recording head over an angle of substantially 180°.
Figure 10:
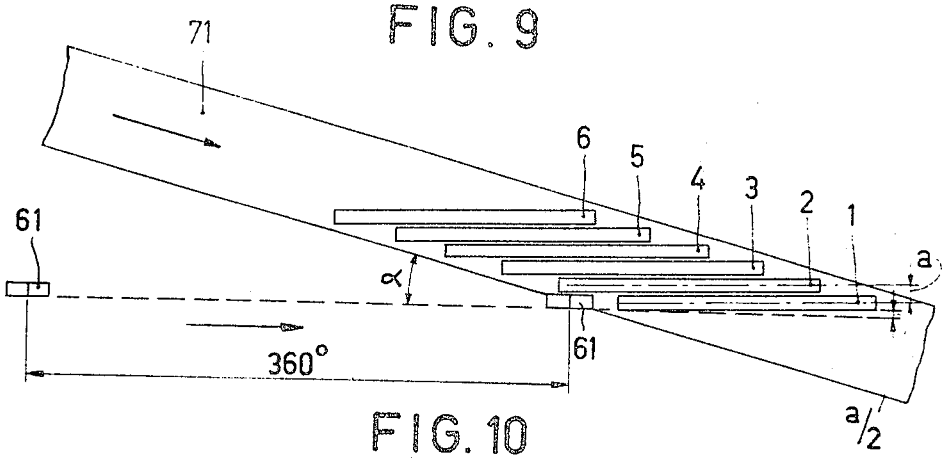
FIG. 10 is an exploded view of the drum and the tape with the tracks recorded thereon in accordance with the invention.

The device for recording video signals of FIG. 9 comprises one recording member 61, which rotates in a slot 64, which is arranged at right angles to the shaft 70 of the drum 65. The recording member scans the record carrier 71 over an angle of substantially 180°. This recording member 61 is fastened to an arm 66, which is connected through a flange 69 with the shaft 70. The record carrier 71 shifts during each revolution over a distance a in the axial direction relatively to the slot, wherein $a$ is the desired distance between two track centers. From FIG. 10 it will be seen that, when one field is recorded per track, the fields 1,2,3, 4 and so on are now recorded, The reproducing device for reproducing the signals thus recorded on the carrier 71 is identical to that of FIG. 7, and the direction of movement of the recording member 61 must,of course, be the same as that of the reproducing members 41 and 42. The reproducing members 41 and 42 scan continuously and the order of scanning of the field is now: 1,2,2,3,3,4 and so on. In this case, however, the difficulty arises that after the reproduction of one track the two successive line pulses are at half the normal distance, which means very sever requirements for the synchronization of the line time base, which can substantially not be fulfilled by the conventional "fly-wheel" circuits, so that the picture is very jittery and may even get out if synchronization. This may also be obviated in a fairly simple manner by providing for the second reproducing member, as is shown in FIG. 9, an additional displacement along the circumference over half a line interstice of a recorded track. This applies, in general, when an odd number of interlaced fields is recorded on one track and an even number of reproducing members is used ($n$ = an even number). With an even number the aforesaid complication does not appear.

What is claimed is:

1. A method of reproducing and recording video signals on a record carrier in tracks which each contain the information of at least one field period of the video signal comprising the steps of recording the first successive $kn$ fields of the first $kn^2$ fields of the video signal, recording the first successive KN fields of the second and further $kn^2$ fields of the video signal, sequentially scanning the first recorded $kn$ fields, sequentially scanning $kn$ fields starting at the second scanned field of the previous scan and including the first recorded field of the second $kn^2$ fields, and repeatedly sequentially scanning $kn$ fields of the recorded signals starting at the second scanned field of each previous scan and including the next successive unscanned field of said video signal.

2. Apparatus for recording and reproducing video signal fields on a record carrier, comprising means for recording in successive groups of $n$ tracks on said record carrier the first successive $kn$ fields of each $kn^2$ fields of said video signal (where $k$ is positive integer and $n$ is an integer greater than 1), and means for sequentially scanning the first recorded $kn$ fields and for scanning successive groups of recorded $kn$ fields starting at the second scanned field of each previous scan and including the next successive unscanned field.

3. Apparatus as claimed in claim 2 wherein said record carrier is a recording tape and wherein said recording and scanning means comprises:

a drum, a unidirectional rotatable shaft axially aligned with said drum,

N recording and reproducing members rotatably mounted on said shaft and extending radially from said shaft a distance R, said drum having a circumferential slot aligned with the path of said recording members, wherein said recording tape is adjacent said slot and is adjacent $(360/n)°$ of the path of said recording members, wherein said recording tape is angularly displaced from the path of said recording member by an angle $\alpha$, wherein each said recording and reproducing member is displaced from a preceding member by a distance along the path of the recording member defined by $$\frac{(M-1)\left(\frac{2\pi R}{N}+\frac{N-1}{N}A\,\text{cotg}\,\alpha\right)}{}$$

where $m$ is the ordinal number of the head, and $a$ is the distance between track centers measured parallel to said shaft, and, wherein each said recording member is displaced from a preceeding number in a direction parallel to the shaft a distance $(m-1)(n-1/1)a$.

4. Apparatus for recording and reproducing video signal fields on a recording tape, comprising a drum, a rotatable shaft axially aligned with said drum, means for rotatably mounting a single recording member on said shaft to extend radially from said shaft a distance R, said drum having a circumferential slot aligned with the rotational path of said recording member, said recording tape being adjacent said slot for $(360/n)°$ of the path of the recording member, said recording member comprising means for recording the first $k$ of each $kn$ successive video signal fields in tracks on said record carrier (where $k$ is a positive integer and $n$ is an integer greater than 1), means including $n$ reproducing members on said shaft in the path of said slot for scanning the first field of $n$ recorded tracks and for scanning the record carrier in groups of $n$ successive recorded fields starting with the second recorded field scanned by a previous scan and including the next successive unscanned field, the recording tape being angularly displaced from the path of the recording member by an angle $\alpha$, wherein said recording tape is shifted a distance $a$ measured in the direction of said shaft after each rotation of the recording member, each reproducing member being displaced from a preceeding reproducing member by a distance measured along the path of the recording member and defined by $$\frac{(M-1)\left(\frac{2\pi R}{N}+\frac{N-1}{N}\cdot A\,\text{cotg}\,\alpha\right)}{}$$

, where $m$ is the ordinal number of the track and $a$ is the distance between track centers measured parallel to the shaft, and wherein the recording member is displaced from a preceeding member in a direction parallel to the shaft a distance $(m-1)(n-1/n)a$.

* * * * *